United States Patent

Hutton

[15] 3,646,954

[45] Mar. 7, 1972

[54] SERVICE TAP TOOL

[72] Inventor: Walter C. Hutton, 1567 Waldran Avenue, Los Angeles, Calif. 90041

[22] Filed: Oct. 28, 1970

[21] Appl. No.: 84,784

[52] U.S. Cl. ............................................. 137/318, 408/105
[51] Int. Cl. ........................................................ F16k 43/00
[58] Field of Search .................. 137/318, 317, 319; 408/105; 285/197, 198, 199

[56] References Cited

UNITED STATES PATENTS

| | | | |
|---|---|---|---|
| 210,706 | 12/1878 | Penney | 137/318 X |
| 443,431 | 12/1890 | Diebel | 408/105 X |
| 1,065,248 | 6/1913 | Hinman | 137/318 X |
| 3,516,426 | 6/1970 | Toll | 137/318 X |

*Primary Examiner*—M. Cary Nelson
*Assistant Examiner*—David R. Matthews
*Attorney*—Christie, Parker & Hale

[57] ABSTRACT

A plug section of a body is adapted to be received in the bore of a coupling of a branch connection from a plastic main containing gas under pressure. An O-ring on this plug section cooperates with the wall of the bore of the coupling to effect a seal. Rotation of a cam follower on a cam of the body brings a locking arm in behind a shoulder of the coupling. Air, admitted through a valve carried by the body, forces the arm into secure engagement with the shoulder of the coupling to secure the tool for making a tap. A boring bar, slidably received in a bore of the body, carries a shell cutter which is used to tap the main.

For heavy-duty service, two locking arms, each carried by a different cam follower on different cams of the body, are adapted to engage the shoulder of a coupling 180° apart from one another. The high points of the cams are 180° from each other and have a rise sufficient for the locking arms to clear the coupling when inserting the plug section into the bore of the coupling. The 180° rotation of the followers brings the locking arms radially inward behind the shoulder of the coupling. A detent lock secures the followers together in this closed position.

16 Claims, 5 Drawing Figures

1

SERVICE TAP TOOL

BACKGROUND OF THE INVENTION

The present invention relates in general to the art of tapping pipes containing a fluid under pressure and, more in particular, to a service tap tool especially adapted for effecting such a tap in the making of a branch connection.

Plastic pipes are coming into increased usage for supplying, for example, natural gas. It is often necessary to make a branch connection from a main to provide a new service outlet. Obviously it is impractical in every instance to stop off the main in order to establish a service branch connection.

As a consequence, it is established practice to make what is known as a "hot tap" of the main. This means that a hole in the main is made while the main contains gas under pressure. Obviously, the tools used to make hot taps must not allow gas to escape to atmosphere. Prior to this invention, the apparatus for making hot taps were complicated to use, required a relatively high degree of expertise in their use, allowed too much room for error, and were relatively high-priced.

SUMMARY OF THE INVENTION

The present invention provides a service tap tool for making hot taps in a pipe containing a fluid under pressure which is relatively simple, easy and quick to operate, and which is considerably less expensive than the service tap tools previously available.

In its simplest specific form, the present invention provides a service tap tool having a boring bar, a body and a locking arm assembly. The body has a plug section for receipt in the bore of a coupling of a service branch connection. Means on the plug section, such as an O-ring is provided to effect a pressure tight seal between the coupling and the plug section and prevent leakage out the end of the coupling. The locking arm assembly preferably includes a cam follower which, for its part, is rotatably received on a cam of the body, the cam surface lying on a circle having its center offset a predetermined distance from the longitudinal axis of the body. The locking arm has means for engaging the shoulder of the coupling. To this end, it is preferred for the locking arm to extend axially and then radially inward to present a locking flange for engaging the rear shoulder of the coupling. The rise of the cam is such that a predetermined rotational displacement of the cam follower will effect radial inward movement of the locking arm's flange behind the shoulder of the coupling. The boring bar is slidably received in an axial bore of the body and carries means to effect a hold, as by cutting, in a pipe to be tapped. Such means may be in the form of a standard shell cutter. A selectively actuatable valve is preferably provided, which may be carried by the body, to admit pressurized fluid into a branch connection of which the coupling is a part, and, preferably, to displace the body and locking arm flange with respect to the coupling to firmly engage the flange with the coupling. Preferably, means are also provided to rotate the boring bar in the cutting operation, such as a wrenching nut or handle.

The preferred embodiment of the present invention has two locking flanges, each carried by an associated cam follower which track on individual cam surfaces having their minimum rise with respect to the axial centerline of the body 180° apart from one another. The cam surfaces are disposed such that when the locking arm flanges are over the high points of their associated cam surfaces, the locking flanges are spaced from the axial centerline of the body sufficiently to clear the outer diameter of the coupling. The cam surfaces also enable 180° rotation of the locking arm flanges from the points of their maximum separation to approach one another for the flanges' engagement of the shoulder of the coupling. Preferably a lock is provided which couples the followers together in the locking arms' closed position. If desired, means such as a stop carried by the boring bar can be provided to ensure against cutting a hole in the backside of a pipe. It is also preferred to have means such as teeth to grip the shoulder of the coupling on the locking flanges.

These and other features, aspects and advantages of the present invention will become more apparent from the description, appended claims and drawings.

BRIEF DESCRIPTION OF THE FIGURES

FIG. 4 is a partial view of a preferred form of the follower lock of the present invention.

DESCRIPTION OF THE PREFERRED EMBODIMENTS

Figure 5:
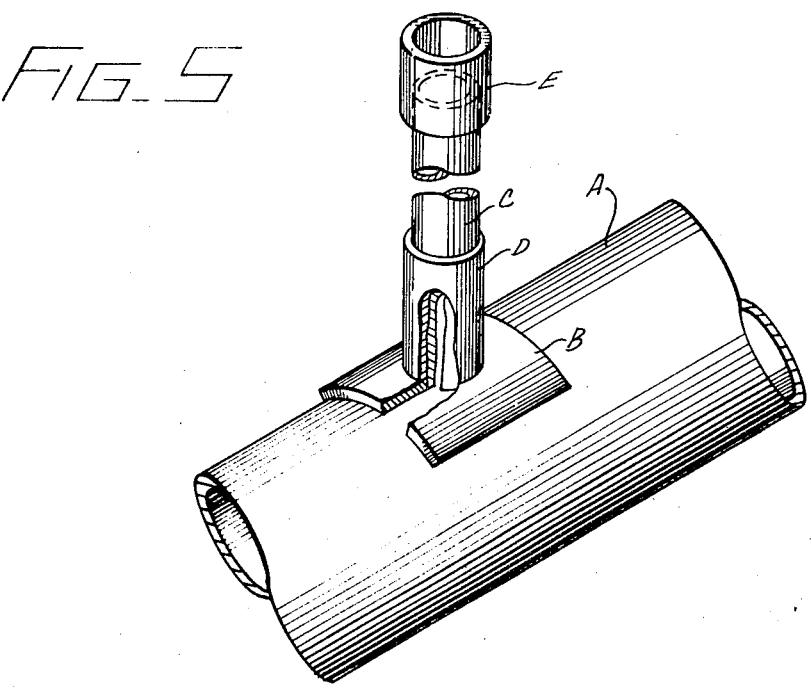
FIG. 5 is a perspective view, partly broken away, of a main and a branch connection to illustrate the application of the service tap tool of the present invention.

A brief reference to FIG. 5 will enable a better understanding of the preferred embodiments of the present invention. The Figure illustrates a main A having a branching saddle B fused to it. A nipple C is in turn fused to saddle B in a leg D thereof. A coupling E is fused on the free end of nipple D. The hot tapping tool of the present invention cuts a hole in main A to open nipple C to the main.

Figure 1:
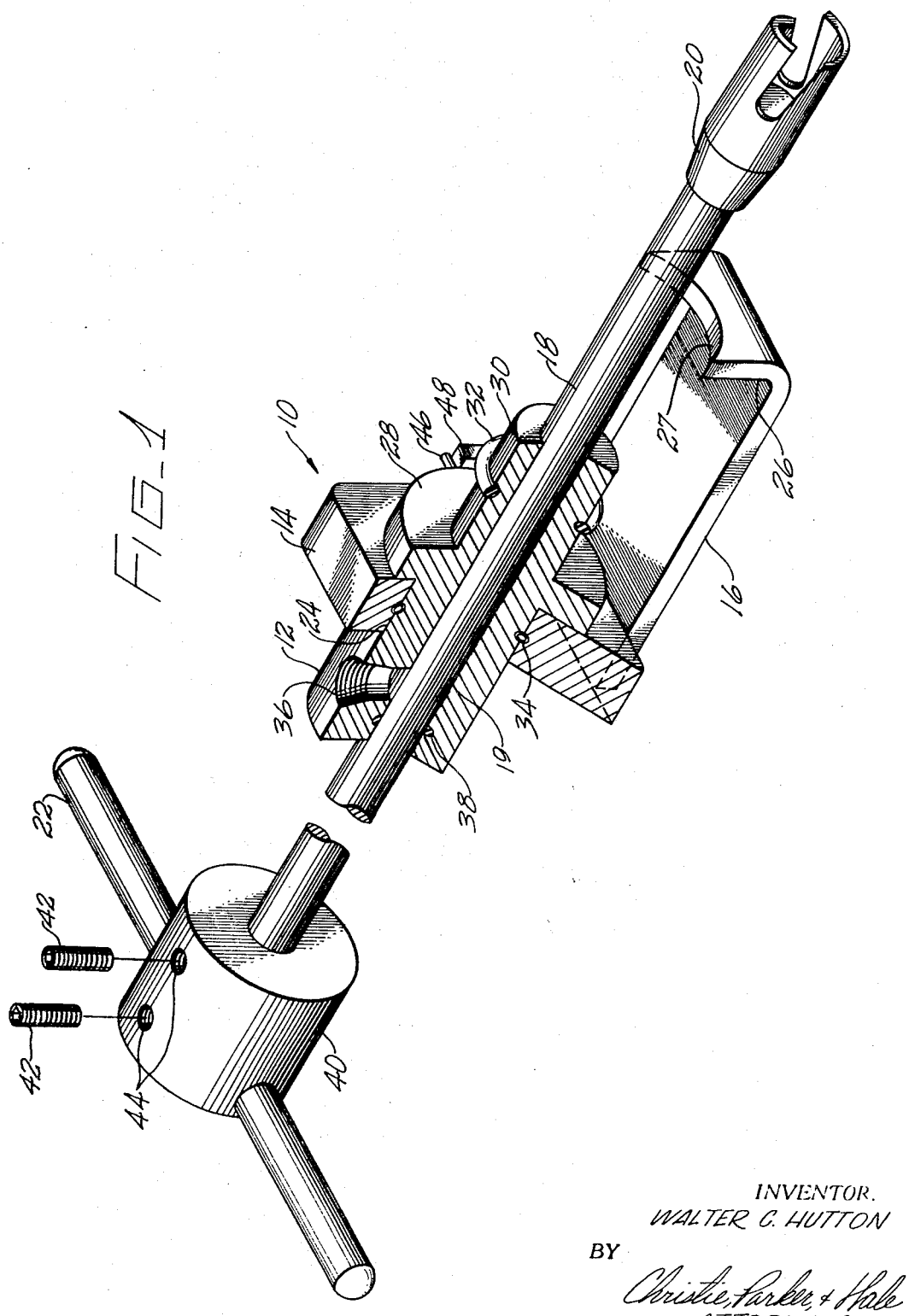
FIG. 1 is a perspective view of one form of the present invention which has been partly cut away for purposes of illustration.

Figure 1 shows a service tap tool 10 which is particularly suited for light service in making hot taps in relatively small pies containing gas at relatively low pressures. The tool includes a body 12, a cam follower 14, a locking arm 16 and a boring bar 18. The boring bar is capable of movement with respect to the body along the body's axial centerline in an axial bore 19 in the body. A shell cutter 20 is attached to the boring bar for rotation with it at the latter's inner end, as by a threaded connection. A handle 22 provides for the hand rotation of the boring bar about its longitudinal axis to effect the cutting of a hole in a pipe by the shell cutter. The locking arm is capable of hand rotation with its cam follower 14.

The follower is disposed on a cylindrical cam surface 24 on the body which has a center of curvature lying along an axis parallel to the body's axial centerline but offset a predetermined amount from this centerline. The center of curvature of the cylindrical cam surface is the axis of rotation of cam follower 14. The predetermined amount of offset of the cam follower's axis of rotation is determined by the amount of offset required for locking arm 16 to move radially in with respect to the axial centerline of the body an amount necessary for a locking flange 26 of the arm to get in behind a shoulder of a coupling, and, upon rotation in a sense to cause the locking arm to move radially outward, to pass over the coupling during tool setup and after a hot tap has been made. The high and low points of cam surface 24 are 180° apart.

The locking arm 16 is attached to cam follower 14 as by a weld and extends axially from its point of attachment parallel to the axial centerline of the body to locking flange 26. Locking flange 26 extends radially inward toward the axial centerline of the body for engaging the shoulder of a coupling. The flange is formed by a bend in the locking arm. An inner surface 27 of the locking flange is concave to provide clearance over the coupling during tool setup and removal as well as close proximity to the nipple extending from the coupling towards the pipe. The close proximity provides a large area of engagement between the shoulder of the coupling and the locking flange. The axial distance between the coupling engaging surface of locking flange 26 and the exposed face of a flange 28 of body 12 is such as to accommodate the axial length of a coupling between them.

The body has retaining flange 28 disposed axially adjacent cam follower 14 to aid in the retention of the follower and to provide a bearing surface to engage the free end of a coupling. A right cylindrical plug section 30 extends axially from this flange towards the shell cutter. The plug section has a diameter which is small enough for its receipt in the bore of the coupling. The axes of the plug section, boring bar 18 and shell cutter 20 are concentric. An O-ring 32 received in an appropriate channel on the external radial surface of the plug section is to provide a pressure tight seal between the wall of the bore of the coupling and the plug section.

The seal prevents loss of air test and seating pressure, to be detailed subsequently, and after a hot tap has been made, to prevent loss of gas from the tapped pipe and branch connection.

The axial length of the plug section corresponds to the length of the coupling between an end and the intermediate, internal ridge within the bore of the coupling. Ideally, in use, this length provides for the axial end of the plug section to abut the interior ridge and the exposed face of flange 28 to abut the end of the coupling. However, due to manufacturing tolerances, the simultaneous occurrence of these engagements is not always possible. Usually, either the end of the plug section or the flange alone is in actual physical engagement with the coupling. Nonetheless, the single engagement of either is adequate to seat the plug section in the coupling.

As previously mentioned, cam follower 14 is received on cylindrical cam surface 24 of the body. The cam follower is axially retained in position next to flange 28 by a roller pin 34 which is received in complementary grooves in the interior surface of the follower and the cam surface of the body.

A threaded hole 36 in the body axially to the rear of cam follower 14 provides for the mounting of an air valve shown explicitly in the next embodiment of the invention to be described. In any event, prior to hot tapping the pipe, the valve provides means to pressurize the branch coupling to test for leaks and to seat the service tap tool and, after a hot tap has been made, to bleed the branch connection and to ensure that it has been completely pinched off. An O-ring 38 received in a complementary groove in the wall of bore 19 of body 12 seals against boring bar 18 to prevent leaks out the rear end of the body.

There is sufficient clearance between the wall of bore 19 of body 12 and the boring bar for air or gas to pass up to O-ring 38.

Handle 22 is held in place in transverse holes in hub 40 which in turn is secured to boring bar 18 as by setscrews 42, the setscrews being received in threaded holes 44 in the hub.

To indicate to the operator of the hot tapping tool illustrated in FIG. 1 that he is either in the lock or free position of locking arm 16, a stop pin 46 is provided for abutting against a pair of lugs disposed 180° apart and secured to cam follower 14 as by welding. One of these lugs is shown by reference numeral 48 in the Figure.

Figure 2:
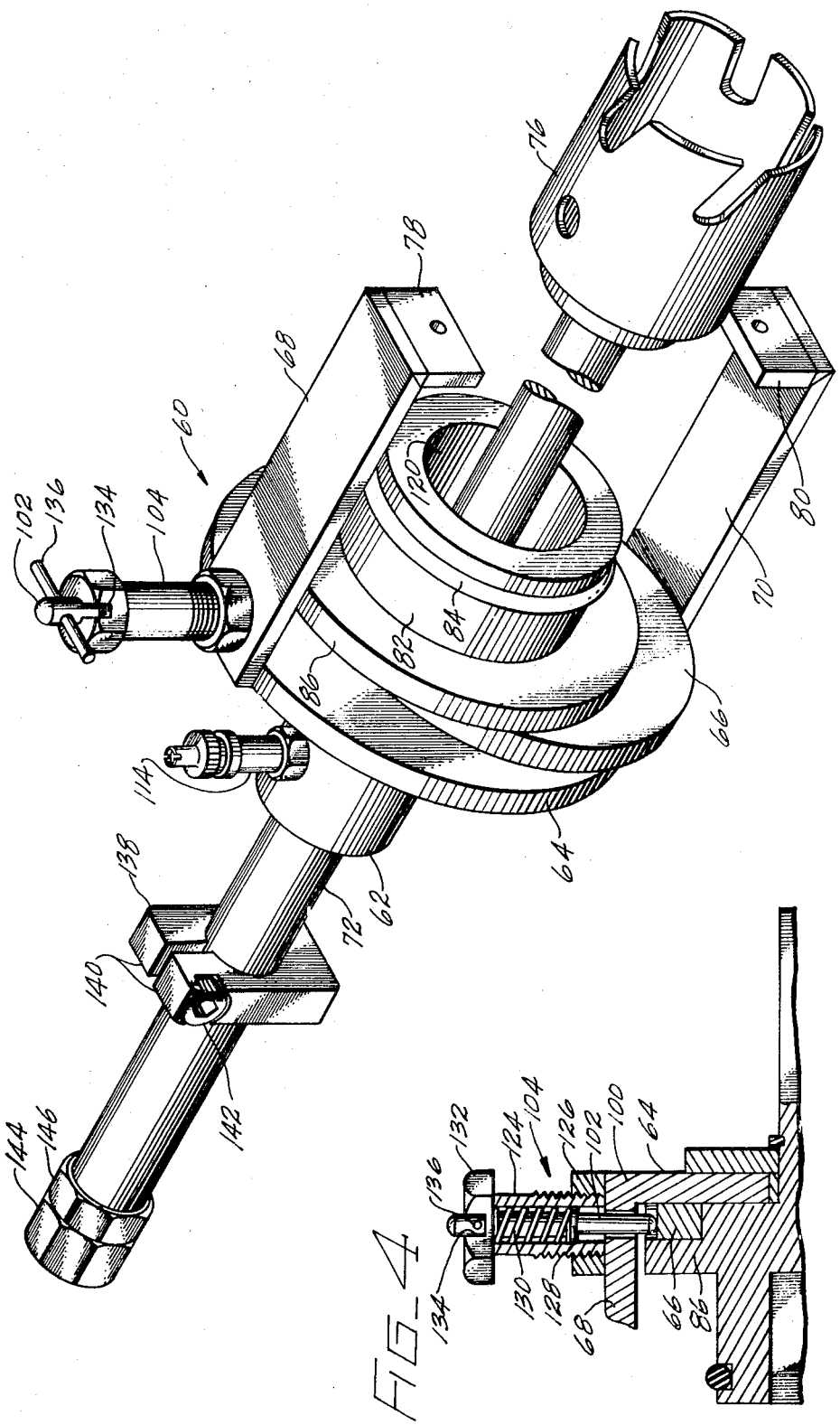
FIG. 2 is a perspective view of a preferred form of the present invention.
Figure 3:
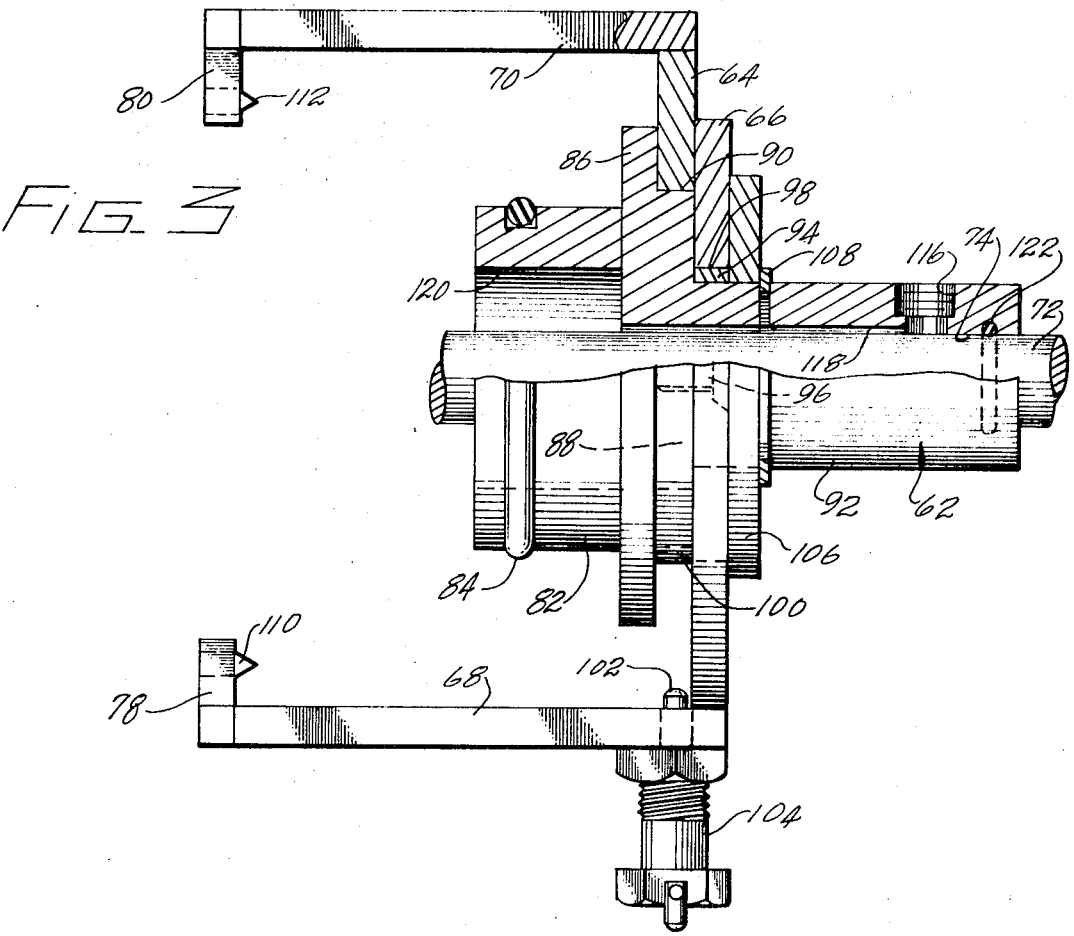
FIG. 3 is a partial view, partly in half section, of the embodiment of the invention illustrated in FIG. 2.

FIGS. 2 through 4 illustrate the presently preferred form of the service tap tool of the present invention. This form is preferred because it admits to a more positive clamping or locking of the tool in place on a coupling of a branch connection than service tap tool 10 illustrated in FIG. 1. Moreover, it provides a convenient means to lock its locking arms in a closed position behind the shoulder of the coupling.

The service tap tool illustrated in these Figures is indicated in general by reference numeral 60. The service tap tool includes a body 62 and a pair of cam followers 64 and 66. Locking arms 68 and 70 are secured to cam followers 64 and 66, respectively, as by welding and extend axially and parallel to the axial centerline of the body for engaging the shoulder of the coupling. A boring bar 72 is slidably received in an axial bore 74 (FIG. 3) of the body and carries a shell cutter 76 for effecting a hole in a pipe. The axial centerline of the body corresponds to the axis of bore 74. Locking flanges 78 and 80 are secured respectively to arms 68 and 70 for actually engaging the shoulder of the coupling.

Cam followers 64 and 66 are rotatable on cams of body 62 between open and closed positions. In the open position arms 68 and 70 are spaced apart 180° from each other and the distance between them is sufficient for clearing the coupling during tool setup and removal. In their alternate closed positions the arms are also spaced 180° apart, but the distance between them is relatively small for engaging the shoulder of a coupling with locking flanges 78 and 80.

As is illustrated to best effect in FIG. 3, body 12 includes a plug section 82 for receipt in the bore of a coupling of a branch connection. As in the previously described embodiment, means such as an O-ring 84 is provided to effect a seal between the wall of the bore of the coupling and the plug section. The O-ring is seated in a groove or the channel in the plug section in a standard manner. A circular cam follower retaining flange 86 at the inner axial end of the plug section is formed integrally with the plug section and extends radially from it. A circular cam 88 is axially adjacent the retaining flange. This cam has a circular cam surface 90 having a center which is offset from the axial centerline of the body a predetermined amount. Cam follower 64 is disposed for rotation on this cam surface. Cam follower 64 is a plate having a circular periphery and a circular hole for receipt on cam 88. The circular periphery and hole of this cam follower are concentric. As previously mentioned, locking arm 70 extends axially from cam follower 64 over plug section 82.

The body continues axially of cam 88 as an essentially constant diameter portion 92.

A circular cam 94 for cam follower 66 is received on this constant diameter portion and is secured in place as by a pair of setscrews to body 62, one of which is shown in phantom by reference numeral 96. Cam 94 has a circular cam surface 98. The diameter of this cam surface is identical to the diameter of cam surface 90 of cam 88, but the axis of rotation effected by cam surface 98 is disposed 180° from the axis of rotation effected by cam surface 90. The center of cam surface 98 is offset from the axial centerline of body 62 the same amount as the center of cam surface 90, and, because of the 180° spacing of the centers lie in a plane containing the axial centerline of the body.

Cam follower 66 is, of course, received on cam 94 for rotation. Cam follower 66 comprises a circular plate having a circular hole in it for receipt on cam 94. The center of the hole however, is not concentric with the center of the circular periphery of the cam. This is to present a locking slot 100 in the periphery of the cam follower to a detent pin 102 of a lock assembly 104 only in the closed position of locking arms 68 and 70.

A circular retaining plate 106 is received on body portion 92 to retain the cam followers in place. Means are provided to retain the retaining plate, such as a standard snapring 108.

As previously mentioned, locking flanges 78 and 80 are carried by their respective cam followers 66 and 64 through arms 68 and 70, respectively. These arms extend axially a distance sufficient to provide for the engagement of the locking flanges with the shoulder of the coupling. Locking flanges 78 and 80 preferably include teeth 110 and 112 for engaging the shoulder of the coupling. The distance between the tips of these teeth and the face of retaining flange 86 is sufficient to accommodate the length of a coupling. The locking flanges lie in a common plane normal to the axial centerline of the body. The length of arm 68 exceeds the length of arm 70 by an amount necessary to compensate for the axial displacement of cam follower 66 from cam follower 64.

An air valve 114, preferably a standard tire valve, is secured to body 62 in a threaded bore 116 (FIGS. 2 and 3). An axially extending slot 118 between this bore and an enlarged bore 120 in plug section 82 provides for air communication between the air valve and the interior of the branch connection. An O-ring seal 122 in an annular channel in the wall of axial bore 74 of body 62 seals against boring bar 72 to prevent air or gas escape out that end of the body.

With particular reference to FIG. 4, lock assembly 104 for securing cam followers 64 and 66 and their carried locking arms and flanges in place in the closed position of the surface tap tool is illustrated. The lock assembly is mounted on arm 68 and is therefore carried by cam follower 64. Detent pin 102 is disposed in a bore of an externally threaded bushing 124. This bushing in turn is threadedly received in a nut 126 which is secured to arm 68 as by a weld. A flange 128 on pin 102 provides a guide for the pin along the bore of the bushing. A spring 130 receives pin 102 and acts against flange 128 and a hex head 132 of the bushing. Head 132 has a diametrically oriented slot 134 which is for the receipt of a cross pin 136. In the locking position this pin is received in the slot and detent pin 102 is also received in locking slot 100 in the periphery of cam followers 66. A hole in arm 68 provides for the detent pin's passage through the arm. As mentioned previously, the location of locking slot 100 corresponds to the closet 180° disposition of arms 68 and 70, that is, the closest distance between the arms when the arms are 180°apart.

A stop 138 is received on boring bar 72 for manual disposition at a point along the bar where the stop will encounter portion 92 of the body before shell cutter 76 reaches the far wall of the pipe being tapped. The stop has a pair of parallel lugs 140 which receive an allen head screw 142. The tightening of screw 142 secures stop 138 at the desired point along boring bar 72.

A wrenching nut 144 is threaded on the end of boring bar 72 opposite shell cutter 76 and is secured in place there by a lock nut 146. The operation of a wrenching toll on nut 144 produces rotation of boring bar 72 and shell cutter 76.

Shell cutter 76 is of standard design and, therefore, will not be described in detail.

The operation of the embodiment illustrated in FIG. 1 is as follows. Cam follower 14 is rotated to its open stop position with stop pin 46 abutting one of the lugs 48. Plug section 30 is then inserted into the bore of coupling E of Figure 5. Cam follower 14 is then rotated to its closed stop position to bring locking flange 26 in behind the shoulder of coupling E. Air under pressure is then admitted through an air valve. The pressure of this air will set the tool with respect to the coupling by forcing the locking flange into clamping engagement with the shoulder of the coupling. Shell cutter 20 is then brought into engagement with the pipe or main to be hot tapped by sliding boring bar 18 in bore 19 of body 12. If desired, the joints of the branch connection can be soap-bubble tested to be sure that the joints are pressuretight. Handle 22 is rotated in a sense to cause shell cutter 20 to cut a hole in the main. After the hole is made, the shell cutter is withdrawn until it abuts plug section 30. Nipple C is then squeezed off in a standard manner. The air valve is then opened to ensure that the nipple has been properly squeezed off, that is, that there are no leaks. Follower 14 is then rotated to its alternate stop position to bring the locking flange clear of the shoulder of the coupling. The tool is then withdrawn by pulling it away from the coupling.

The operation of the embodiment illustrated in FIGS. 2 through 4 is as follows. Followers 64 and 66 are rotated to their open position with locking arms 68 and 70 diametrically opposite each other. Plug section 82 is then inserted into the bore of the coupling. Followers 64 and 66 are then rotated to their closed position, corresponding to 180° rotation of each of the arms 68 and 70. In the closed position, locking flanges 78 and 80 will be in behind the shoulder of the coupling, and detent pin 102 of lock assembly 104 will be in locking slot 100 of cam follower 66. Air is then admitted through air valve 114 into the nipple. The joints of the connection are leak tested as by a soap bubble test. With the pressurization of the connection, teeth 110 and 112 of locking flanges 78 and 80 will engage the shoulder of the coupling. Boring bar 72 is slid in body 62 to engage shell cutter 76 with the pipe or main being hot tapped. A wrenching tool on wrenching nut 144 rotates the shell cutter in a sense to cut a hole in the pipe. Stop 138, having previously been adjusted, will engage body 62 before the shell cutter engages the opposite wall of the pipe. The shell cutter is then withdrawn from the pipe into enlarged bore 120 of plug section 82. The nipple is then squeezed off. After the nipple has been squeezed off, air valve 114 is then opened to bleed away gas within the connection and to ensure that the nipple has been properly squeezed off. Detent pin 102 is then lifted and rotated to bring cross pin 136 out of slot 134. Followers 64 and 66 are then rotated to bring locking arms 68 and 70 to their open position, a position for each of the arms 180°from its closed position. The tool is then withdrawn from the coupling.

The present invention has been described with reference to certain embodiments. The spirit and scope of the appended claims should not, however, necessarily be limited to the foregoing detailed description.

What is claimed is:

1. An improved service tap tool for making hot taps in pipe containing a fluid under pressure and having a branch assembly affixed thereto which includes a coupling having a shoulder facing the pipe, the service tap tool comprising:
   a. a body having an axial bore;
   b. an axially oriented plug section on the body for receipt in the bore of the coupling, the axial bore passing through the plug section;
   c. means for effecting a pressuretight seal between the plug section and the wall of the coupling's bore;
   d. a boring bar slidably received in the axial bore;
   e. means on the boring bar for effecting a hole in the pipe; and
   f. a locking arm having means for engaging the shoulder and being rotatably mounted on the body for rotation about an axis offset from the axis of the axial bore between an open position where the engaging means is disposed to clear the coupling and a closed position where the engaging means is in a position to engage the shoulder.

2. The improved service tap tool claimed in claim 1 wherein:
   the locking arm is rotatably received on a circular cam of the body, the arm having a rotational axis offset from the axis of the boring bar a predetermined amount to effect a rise between the closed position and the open position for the engaging means to respectively engage the shoulder and clear the coupling.

3. The improved service tap tool claimed in claim 2 wherein:
   the engaging means includes a locking flange on the arm which extends radially inward from the arm towards the axis of the bore in the body.

4. The improved service tap tool claimed in claim 3 wherein the locking flange has a concave surface at its radial innermost end to provide clearance between the flange and the coupling in the open position of the arm.

5. The improved service tap tool claimed in claim 1 including:
   an air valve selectively operable to admit air through the plug section into the nipple.

6. An improved service tap tool for making a hole in a pipe containing a fluid under pressure and having a branch assembly affixed thereto which includes a coupling attached to a nipple with the coupling presenting an exposed shoulder between it and the nipple, the improved service tap tool comprising:
   a. a body having an axial bore therethrough, a plug section at one end of the body having a diameter for receipt in the bore of the coupling, and a flange meeting the plug section for engaging the free end of the coupling;
   b. a circular cam on the body having a center of curvature offset from the axis of the axial bore a predetermined amount;
   c. a cam follower rotatably received on the cam;
   d. a locking arm extending axially from the cam follower past the end of the plug section and having a radially inward directed locking flange for selective engagement of the shoulder of the coupling, the axial distance between the flange of the body and the locking flange being at least equal to the axial span of the coupling, the offset axis of the cam being such that rotation of the cam follower a predetermined amount will position the locking flange in behind the shoulder in a closed position from an open position, the open position being such that the locking flange is capable of clearing the coupling;

e. means on the plug section for effecting a seal between it and the wall of the bore of the coupling;
f. a boring bar slidably and rotationally received in the bore of the body having means for its rotation;
g. a shell cutter on an end of the boring bar on the same side of the body as the plug section; and
h. means for selectively admitting a pressurized gas to the nipple.

7. An improved service tap tool for making a hole in a pipe containing a fluid under pressure and having a branch assembly affixed thereto which includes a coupling attached to a nipple with the coupling presenting an exposed exterior radial shoulder between it and the nipple, the improved service tap tool comprising:
a. a body having a right cylindrical plug section for receipt in the bore of the coupling and an axial bore extending through the body having an axis concentric with the axis of the plug section;
b. means on the plug section for effecting a pressure tight seal between the plug section and the coupling;
c. a first circular cam on the body having a center of curvature offset from the axis of the body's bore a predetermined amount;
d. a first cam follower rotatably received on the first cam surface;
e. a first locking arm carried by the first cam follower, extending axially over the plug section, and having means for engaging the shoulder of the coupling;
f. a second circular cam on the body having a center of curvature offset from the axis of the body's bore a predetermined amount;
g. a second cam follower rotatably received on the second cam surface;
h. a second locking arm carried by the second cam follower, extending axially over the plug section, and having means for engaging the shoulder of the coupling;
i. the offset axes of the first and second circular cams and the first and second locking arms being disposed such that the arms are rotatable between an open position for clearing the coupling and a closed position for the engaging means to engage the shoulder of the coupling;
j. a boring bar slidably and rotationally received in the body's axial bore; and
k. means attached to the boring bar on the plug section side of the body for effecting a hole in the pipe.

8. The service tap tool claimed in claim 7 including means to lock the locking arms in their closed position.

9. The service tap tool claimed in claim 7 including air valve means for selectively admitting and discharging air into the nipple.

10. The service tap tool claimed in claim 9 wherein:
a. a flange on the body is provided at the inner axial end of the plug section; and
b. the axial length of the plug section is such that the free end of the nipple is capable of being engaged by the flange on the body and an interior ridge in the bore of the nipple is capable of being engaged by the end of the plug section.

11. The service tap tool claimed in claim 7 including stop means adjustably carried by the boring bar for engaging the body to prevent effecting a hole in the pipe on the opposite side of where a hole is desired.

12. An improved service tap tool for making hot taps in a pipe containing a fluid under pressure and having a branch assembly affixed thereto which includes an interior exposed shoulder facing the pipe, the service tap tool comprising:
a. a body having an axial bore and a plug section, the plug section being adapted for receipt in the bore of the coupling;
b. means for effecting a pressure tight seal between the body and the coupling to prevent loss of fluid therefrom;
c. first and second circular cams on the body, each having a center of curvature offset from the axis of the body's axial bore a predetermined amount on diametrically opposite sides of the axis of the body's axial bore;
d. first and second locking arm assemblies disposed for rotation on the first and second cams, respectively, each locking arm assembly having an arm extending axially past the plug section with means for engaging the shoulder of the coupling, the locking arm assemblies being constructed and arranged for rotational disposition between a closed position with the engaging means of the arms being sufficiently close to the axis of the body's bore to engage the shoulder of the coupling and an open position where the engaging means are capable of clearing the coupling:
e. a boring bar slidably and rotationally received in the axial bore of the body having means for effecting a hole in the pipe; and
f. valve means for selectively admitting a pressurized fluid into the branch assembly to seat the plug section in the nipple.

13. The service tap tool claimed in claim 12 including means for selectively locking the locking arms in their closed position.

14. The service tap tool claimed in claim 13 wherein:
a. the locking arm assemblies each includes a cam follower rotatably mounted on its associated cam;
b. the closed position of the arms corresponds to an angular disposition of the arms from each other of about 180°; and
c. the locking means includes a detent pin, carried by one of the cam followers, biasing means for urging the detent pin into a locking position, and means on the other cam follower for engaging the detent pin when the arms are in their closed position.

15. The service tap tool claimed in claim 14 wherein the body includes a flange at the inner axial end of the plug section for abutting the end of the coupling.

16. The service tap tool claimed in claim 15 wherein the engaging means includes a locking flange on each of the arms extending radially inward toward the axis of the body's axial bore, and means on each of the locking flanges for gripping the shoulder of the coupling.

* * * * *